US011875321B1

(12) United States Patent
Singh et al.

(10) Patent No.: US 11,875,321 B1
(45) Date of Patent: Jan. 16, 2024

(54) CARD ENABLED SERVICES

(71) Applicant: Wells Fargo Bank, N.A., San Francisco, CA (US)

(72) Inventors: Manpreet Singh, Telangana (IN); Parul Ghosh, Karnataka (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/143,609

(22) Filed: Jan. 7, 2021

(51) Int. Cl.
*G06Q 20/00* (2012.01)
*G06Q 20/10* (2012.01)
*G06Q 20/34* (2012.01)
*G06Q 20/32* (2012.01)
*G06Q 20/02* (2012.01)
*H04L 9/40* (2022.01)
*H04W 76/10* (2018.01)
*H04L 67/141* (2022.01)
(Continued)

(52) U.S. Cl.
CPC ........... *G06Q 20/108* (2013.01); *G06Q 20/02* (2013.01); *G06Q 20/102* (2013.01); *G06Q 20/32* (2013.01); *G06Q 20/3229* (2013.01); *G06Q 20/341* (2013.01); *G06Q 20/352* (2013.01); *H04L 63/0428* (2013.01); *H04L 63/08* (2013.01); *H04L 67/141* (2013.01); *H04W 76/10* (2018.02); *A63B 22/02* (2013.01); *A63B 71/0622* (2013.01); *A63B 2071/0694* (2013.01); *A63B 2225/15* (2013.01); *A63B 2225/50* (2013.01); *G06Q 2220/00* (2013.01); *H04W 4/80* (2018.02)

(58) Field of Classification Search
CPC ............................ G06Q 20/308; G06Q 20/108

USPC .......................................................... 705/40
See application file for complete search history.

(56) References Cited

U.S. PATENT DOCUMENTS 9,396,593 B2 *  7/2016  Suwald ................... G07C 9/247
2011/0202465 A1 *  8/2011  Mashhour ............. H04L 9/3226
                                                                  705/67
(Continued)

FOREIGN PATENT DOCUMENTS

AU  2014205135 B2 *  4/2016 ............... G06T 1/20
WO  WO-2017198842 A1 * 11/2017 ......... G06K 19/0708

OTHER PUBLICATIONS

Authors: Deepale Kayande et al : Overview of a payment solution for NFC-Enabled Mobile phones' IEEE Conf. Paper: Xplore IEEE: Date of Conference: Nov. 18-19, 2016 Date Added to IEEE Xplore: Apr. 6, 2017 (Year: 2016).*

(Continued)

*Primary Examiner* — Bruce I Ebersman
*Assistant Examiner* — Hatem M Ali
(74) *Attorney, Agent, or Firm* — K&L Gates LLP

(57) ABSTRACT

A card, such as a payment card, can enable provisioning of services. The card includes hardware and software that enable the card to connect to a local device that includes a display. Further, the card can comprise hardware and software that allow the card to connect to a remote server, in one instance by way of a dedicated communication channel. The card can also include a processor and memory that stores instructions that when executed by the processor provide services, such as bank services. The display is provided with graphical elements by the service for rendering including data from a bank or other remote server. A device or interactive display can enable user interaction with services.

20 Claims, 10 Drawing Sheets

(51) Int. Cl.
*H04W 4/80* (2018.01)
*A63B 71/06* (2006.01)
*A63B 22/02* (2006.01)

(56) References Cited

U.S. PATENT DOCUMENTS

| | | | |
|---|---|---|---|
| 2014/0270404 A1* | 9/2014 | Hanna | G06V 40/45 |
| | | | 382/116 |
| 2015/0262052 A1* | 9/2015 | Pahuja | G06Q 20/363 |
| | | | 340/10.52 |
| 2017/0178115 A1* | 6/2017 | Todasco | G06Q 20/367 |
| 2021/0117750 A1* | 4/2021 | Carroll, II | G06Q 20/26 |

OTHER PUBLICATIONS

Authors: Teddy Mantero et al: Online payment procedure involving mobile phone network infrastructure and devices: IEEE Xplore: Date of Conference: Apr. 7-9, 2011 Date Added to IEEE Xplore: Jul. 12, 201 (Year: 2011).*

Authors: Sulaiman Alazmi et al: Title: A Comprehensively Secure Smart card access controls; IEEEE Xplore; Conference Start Date: Apr. 25, 2018; Publication Date: Apr. 1, 2018 (Year: 2018).*

Authors: A. Gaurav et al; Title: Using Personal Electronic Device for Authentication-Based Service Access; IEEE Xplore; Publication Date: May 1, 2008; Conference Start Date: May 19, 2008 (Year: 2008).*

Authors: A. Gaurav et al; Title: Using Personal Electronic Device for Authentication-Based Service Access; IEEE Xplore; Publication Date: May 1, 2008: Conference Start Date: May 19, 2008 (Year: 2018) (Year: 2008).*

Authors: Sulaiman Alazmi et al: Title: A Comprehensively Secure Smart card access controls; IEEEE Xplore; Conference Start Date: Apr. 25, 2018; Publication Date: Apr. 1, 2018 (Year: 2018) (Year: 2018).*

Authors: A. Gaurav et al; Title: Using Personal Electronic Device for Authentication-Based Service Access; IEEE Xplore; Publication Date: May 1, 2008: Conference Start Date: May 19, 2008 (Year: 2008) (Year: 2018).*

* cited by examiner

CARD ENABLED SERVICES

BACKGROUND

People typically perform banking activities daily. Nevertheless, a person may not always have access to an automated teller machine (ATM) or personal device to perform a banking activity such as account management or bill payment. Furthermore, the person may not have access to a network to perform such activity by way of a mobile application or website. Still further yet, even if a network is available, security on the network can be suspect.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to card enabled services. Access to network-accessible services can be enabled by way of a card, such as a payment card. The card can include a first communication mechanism to connect to substantially any local device with a display and a second communication mechanism to connect to a remote server, such as a bank server. In accordance with one aspect the second communication mechanism can employ a dedicated communication channel for enhanced security. Further, the card can include a processor coupled to a memory that stores instructions that, when executed by the processor, cause the processor to generate a user interface and convey the user interface to a device for presentation on a display of the device. Further, the interface can incorporate data and requests from a remote server. Upon initial access, the user interface can include a request for credentials or responses to security questions associated with authenticating a user with the remote server. The device or device display can be employed by a user to interact with the interface and provide responses. Once successfully authenticated, the user interface can provide access to a number of services, such as bank services. In this manner a user can employ a payment card as disclosed to perform banking activities, such as account management, bill payment, and fund transfer, through substantially any compatible device with a display.

According to one aspect, a system is provided comprising a processor coupled to a memory on a payment card that includes instructions that, when executed by the processor, cause the processor to establish a connection to a device with a display, connect to a server by way of a dedicated communication channel, generate a user interface that incorporates data received from the server, and convey the user interface to the device for presentation on the display. In one instance, the instructions can further cause the processor to provide one or more bank services by way of the user interface including at least one of bill payment, electronic fund transfer, and checkbook transaction. Further, a two-way connection can be established wirelessly between the payment card and the device. Furthermore, the connection to the server can be established by way of a cellular network. The system can further include instructions that cause the processor to respond to input provided to the device with respect to the display and authenticate a user based on credentials provided as the input. The instructions can also cause the processor to request information regarding the display and configure the user interface based on the information received in response to the request. The device can be substantially any device that includes a display including an exercise machine and an automobile.

According to another aspect, a method is provided comprising initiating connection of a payment card to a device with a display, establishing, with the payment card, a connection to an enterprise server by way of a dedicated communication channel, generating a graphical representation of data received from the enterprise server, and conveying the graphical representation to the device for rendering on the display. In one instance, the graphical interface generated is of a bank service application. Instructions can be executed by a processor on the payment card to generate the graphical representation of the bank service application. The method can further enable at least one of bill payment, electronic fund transfer, or checkbook transaction by way of the bank service application. The method can further process user input received by way of the device in response to the graphical representation. In one instance, establishing connection with an enterprise server comprises establishing the connection wirelessly by way of a cellular network. Further, initiating the connection of the payment card to the device can be performed wirelessly by radio frequency.

In accordance with another aspect, a payment card system comprises a processor coupled to a memory that stores instructions that, when executed by the processor, cause the processor to provide bank services, a subscriber identity module (SIM) that stores an international mobile subscriber identity (IMSI) number and key to establish communication with a cellular network and a bank server, and a device communication component that enables wireless communication with a device comprising a display by way of a radio frequency transmitter and receiver, wherein the display of the device renders a graphical interface for the bank services and data received by the bank server. The payment card system can further comprise a token to enable unique identification, for example by the bank server. Further, the cellular network comprises a dedicated channel for communication with the bank server, and the dedicated channel can be encrypted in response to successful authentication of a user.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

It may be difficult to safely perform daily banking activities such as account management and bill payment. In one instance access can be problematic. For example, an automatic teller machine (ATM) may not always be nearby. Further, a personal device may not be available to utilize mobile or online banking. Even if available, the personal device may not have access to a network to perform banking activities. Moreover, assuming access to a personal device and network access security can be an issue with either or both. For example, mobile telephones support a diverse range of applications and cannot ensure that these are all trusted sources.

Details provided herein generally pertain to card enabled service access and utilization. A payment card can be equipped with a processor, memory, and multiple communication mechanisms. A first communication mechanism enables communication with a local device comprising a display. A second communication mechanism enables communication with a remote server. The memory stores instructions that, when executed by the processor, cause the processor to perform operations associated with a service. In one instance, the service can be a banking service to support online account management, bill payment, fund transfer, and checkbook transactions, among other things. The payment card can utilize the first communication mechanism to connect to a local device that includes a display. Graphical elements associated with the service can be communicated to the device and presented on the display. The second communication mechanism can receive and transmit data to and from a bank server over a dedicated channel associated with such communication. A user can interact with the service by way of the device or interactive display to perform banking activities. A first interaction may correspond to a response for a request for credentials such as a personal identification number (PIN) or answers to security questions to authenticate with the bank server.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
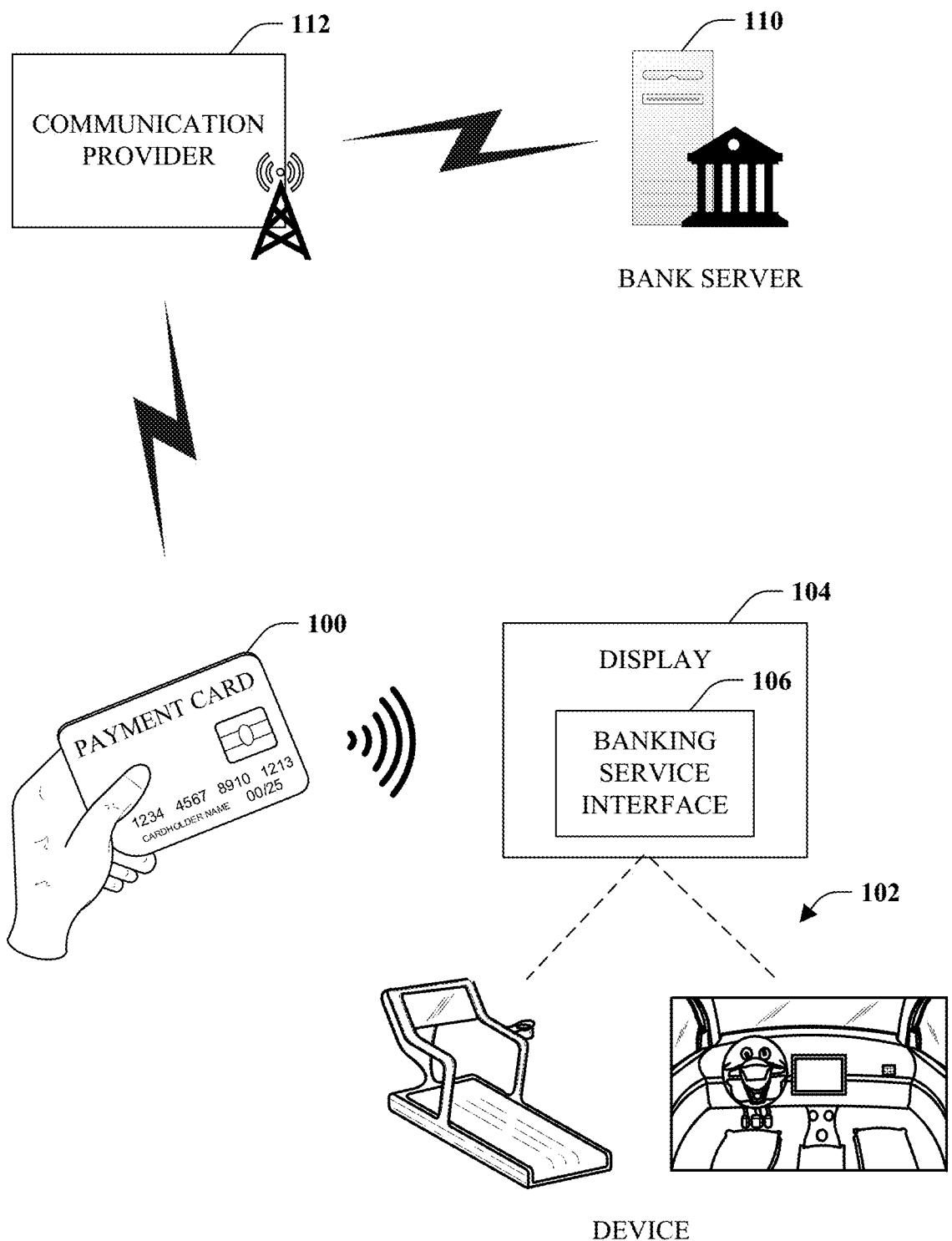
FIG. 1 illustrates an overview of an example implementation.

Referring initially to FIG. 1, a high-level overview of an example implementation is illustrated and described to aid clarity and understanding with respect to aspects of the subject disclosure. As depicted, the implementation includes payment card 100, device 102, display 104, banking service interface 106, bank server 110, and communication provider 112. These various components enable safe access to bank services through a variety of devices.

The payment card 100 (also referred to herein as payment card system) can include a variety of features associated with typical payment cards such as credit cards or debit cards. For example, the payment card 100 can include a card number, name of the account holder, expiration date, verification code, and magnetic strip. The payment card 100 can also include a processor coupled to memory that includes instructions that, when executed by the processor, cause the processor to perform operations associated with bank services. Further, the payment card can have a first communication means to interact with local devices 102 and second communication means to interact with the remote bank server 110. The first communication means can utilize limited distance radio frequency technologies such as but not limited to Bluetooth or near field communication (NFC). The second communication means can correspond to cellular communication. For instance, the payment card 100 can include a subscriber identity module (SIM) that stores an international mobile subscriber identity (IMSI) number and key to establish communication with a cellular network by way of the communication provider 112.

The payment card 100 can communicate with any suitable device 102. A device 102 can be a computing device or nonstandard computing device, such as an internet of things (IoT) device that includes a display and is able to at least receive and respond to communications from the payment card 100. Such devices can include a treadmill or smart car, as shown. Further, such devices can include smart devices such as televisions and appliances as well as security systems, kiosks, and augmented reality or virtual reality glasses, among other things. Each device 102 can include a display 104 that is accessible by the payment card 100. In accordance with one aspect, the device 102 can be registered with either or both of the payment card and bank server 110. Registration can ensure the device is compatible with the payment card 100 and optionally safe (e.g., current with software updates, no history of fraud . . . ), among other things. Further, registration can expedite connection and presentation.

The display 104 can correspond to any mechanism that can present data or information in a visual form. For example, the screen on a treadmill or car interface can correspond to the display 104. The payment card 100 in communication with a device 102 can cause the banking service interface 106 to be rendered on the display. More particularly, the processor on the payment card 100 can execute instructions stored in memory that generate the banking service interface 106 and convey the banking service interface 106 to the device 102 for display. Further, a user can interact with the banking service interface 106 by way of the device or a touchscreen display 104, which can cause the banking service interface 106 to be updated.

The payment card 100 can also communicate with the bank server 110 to enable presentation and interaction with account data of a corresponding bank customer. The bank server 110 and the payment card 100 can be communicatively coupled by way of the communication provider 112. In accordance with one embodiment, the communication provider 112 can be a cellular network provider. The communication provider 112 can receive and transmit data to and from the payment card 100 and the bank server 110. The communication provider 112 can provide a dedicated channel for communication between the payment card 100 and the bank server 110. Security is enhanced by a separate channel for bank related communications. In particular, other applications do not use the same channel thereby reducing the possibility that an application is malicious or compromised in a manner that may negatively impact bank communications. Security can further be enhanced by encrypting communication on the dedicated channel.

The payment card 100 can execute instructions that provide secure banking activities on substantially any device 102 that includes a display 104 by way of the banking service interface 106. For instance, account management and bill payment can be performed by way of the banking service interface 106. Consider a situation in which a card user is at the gym and wants to perform a banking activity. The banking service interface 106 can be rendered on the screen of a treadmill. A request can be made by way of the banking service interface 106 for credentials associated with authentication, for instance by way of requesting a personal identification number (PIN) or responding to security questions presented on the screen. Acquired credentials can be sent to the bank server to authenticate the user for banking access. After verification that the gym member, who is also a card user, performance of actions regarding banking activities, such as account management and bill payment, can be allowed by way of the treadmill screen. Integration into a gym device increases ease of use and reduces both the time taken to perform banking activities and the possibility of errors. A gym member does not need to access an automated teller machine to perform a banking activity. Rather, a verified card user can simply perform the banking activities on the screen of the treadmill.

In another scenario, the payment card 100 can cause a user interface of an online banking system to be displayed on the screen of a verified smart car. The driver can be verified and authenticated by the bank server 110 based on responses to requests for a personal identification number (PIN) or answers to security questions displayed on the screen. After successful verification by the bank server 110 or other delegated system, the driver will be allowed to perform integrated tasks of account management and bill payment on the screen of the smart car, which saves time and reduces errors. A driver, who is also a bank user, need not utilize a mobile phone or laptop to perform a banking activity anymore. Instead, the driver can simply perform banking activities on the screen of the car.

Figure 2:
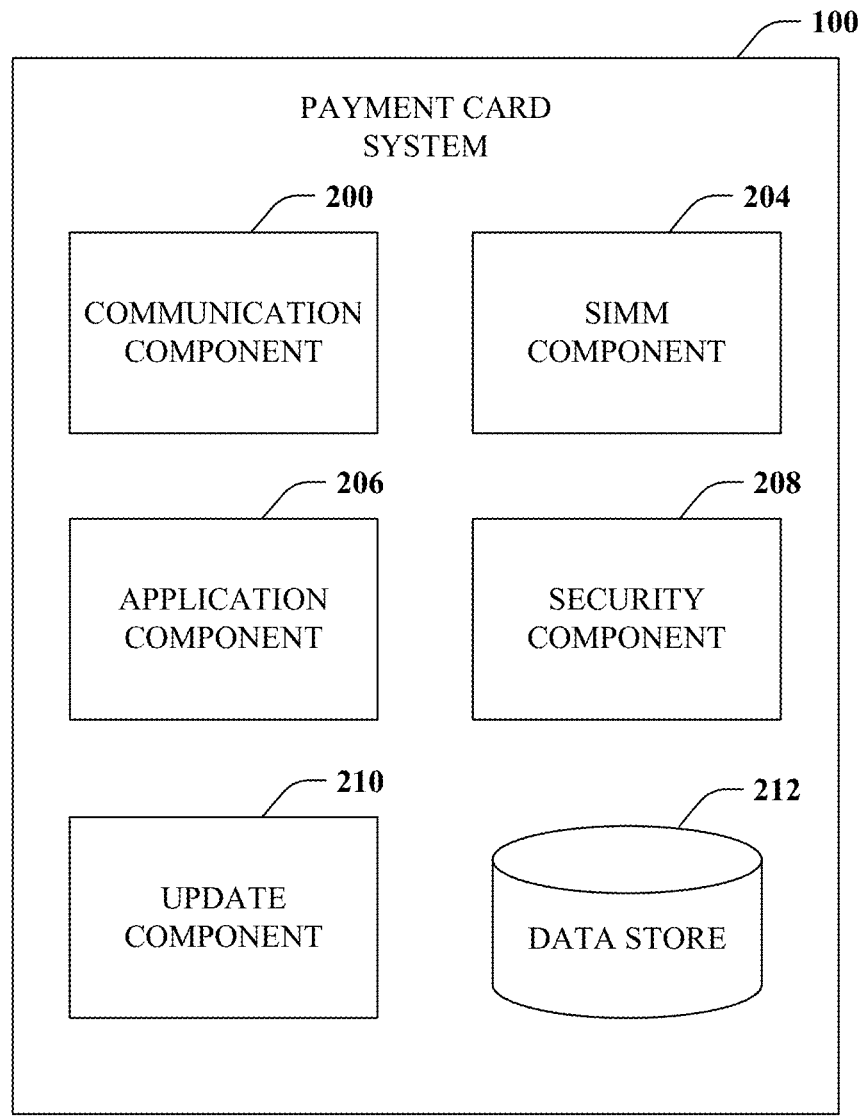
FIG. 2 is a block diagram of an example payment card system.

Turning attention to FIG. 2, an example payment card system 100 (also referred to herein as simply a payment card) is depicted. The payment card system 100 comprises communication component 200, SIM component 204, application component 206, security component 208, update component 210, and data store 212. In one embodiment, the payment card system 100 can correspond to an integrated circuit or microchip incorporated on a plastic card or the like. Functionality of at least a subset of the components can be implemented by an embedded processor coupled to a memory that stores instructions that, when executed, cause the processor to perform the functionality of a component.

The communication component 200 is a mechanism that enables external communications. In one instance, communication can be with devices comprising displays that can be employed by the payment card system 100. In another instance, communication can be with an external enterprise server, such as a bank server. Various mechanisms and protocols can be employed to effect contact or contactless communication. For example, contact points and one or more antennae can be employed to allow communication.

Figure 3:
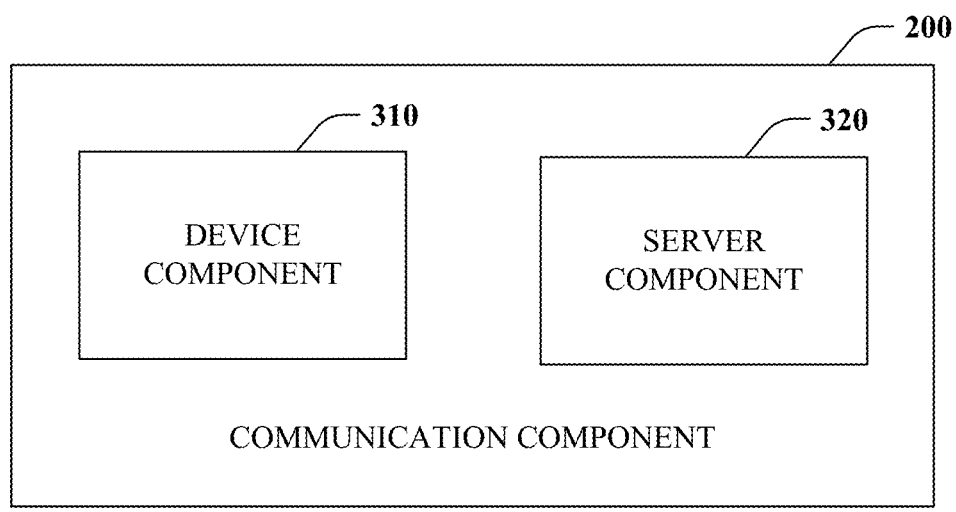
FIG. 3 is a block diagram of an example communication component.

Turning to FIG. 3, an example communication component 200 is illustrated in further detail. As shown, the communication component 200 includes device component 310 and server component 320. The device component 310 supports local communication with one or more devices. The server component 320 enables remote communication with one or more servers or the like.

A device can have a card reader slot in which the payment card is inserted. In this scenario, the device component 310 is configured to support communication by way of direct contact between at least portions of a physical card and the card reader of the device, for example by way of conductive or otherwise communicable materials and supporting protocols. For instance, the device component 310 can operate in a similar manner to how a typical payment processor communicates with payment cards to complete a transaction at checkout.

In an alternate embodiment, the device component 310 can support wireless communication. One or more antennae can be incorporated into a payment card and employed by the device component for receipt and transmission of data by way of radio or another electromagnetic spectrum. By way of example, and not limitation, the device component 310 can employ Bluetooth or near field communication (NFC) protocols over a radio frequency to interact with a device without contact.

The server component 320 is configured to enable communication between the payment card and a remote server or the like, such as a bank server. The server component 320 can establish a connection to a service provider network and aid receipt and transmission of the data from the card to the server and from the server to the card. The server provider network can be but is not limited to a cellular network that employs radio signals by way of terrestrial cell sites or orbiting satellites. Further, in accordance with an aspect of this disclosure, a dedicated communication channel or the like can be employed such that solely communications between the card and remote server used the channel, which can enhance security. By contrast, conventional smart phones and computers allow a communication channel to be shared by multiple applications executing on such a computing device, some of which may pose a security risk.

Returning to FIG. 2, the SIM component 204 can be employed in conjunction with the communication component 200 to establish communication with a network service provider. The subscriber identity module (SIM) component is a mechanism to enable remote communication over a cellular network or the like. More particularly, the SIM component 204 stores an international mobile subscriber identity (IMSI) number and related key used by a carrier to establish communication. Essentially the SIM component 204 communicates with a carrier network and enables access to the network. The SIM component can be a separate physical card added to the card or embedded into the circuitry of the card as an embedded SIM (eSIM).

The application component 206 comprises processor executable instructions that implement particular functionality in addition to control functionality associated with other components of the payment card system. In accordance with one aspect, the application component 206 can comprise instructions associated with performing bank related activities including account management and online bill payment, among other things. The application component 206 can further generate an interface for rending on a display of a device. The communication component 200 can be employed to enable presentation of graphical information on a display of a device. Further, the communication component 200 can enable receipt of user input provided by way of the device or display by the application component 206. The application component 206 can also employ the communication component 200 to enable authentication and interaction with data on an enterprise server, such as a bank server.

Figure 4:
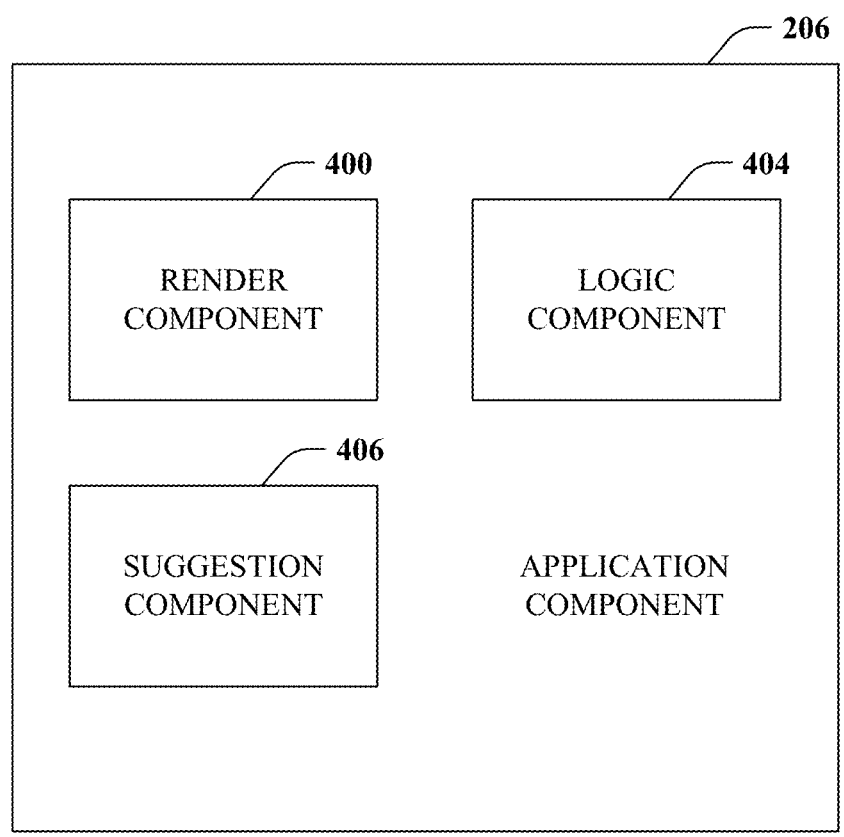
FIG. 4 is a block diagram of an example application component.

Turning attention briefly to FIG. 4, an example application component 206 is depicted in further detail. As illustrated, the application includes render component 400, logic component 404, and suggestion component 406. The render component 400 is configured to generate or render graphical elements for presentation on a display of a communicably coupled device (e.g., treadmill, television, refrigerator, automobile . . . ). Generated graphics including one or more of text, graphical objects, images, and video, among other things, can be conveyed by way of a communication mechanism to a device for presentation on a display or screen of the device.

The logic component 404 can capture the desired functionality of the application and interact with the render component 440. The logic component 404 can specify a user interface be generated by the render component 400, and conveyed to a device to appear on a screen of the device. The interface can be interactive such that data can be provided and received. In one instance, the data can be acquired by way of controls on a device. Alternatively, input can be received by way of a touch screen display or other mechanism. The interface can be updated in response to user input in accordance with instructions specified by the logic component 404.

In accordance with one embodiment, the logic component 404 can specify instructions that provide bank services for a customer of a financial institution. As such, the logic component 404 can provide access to, and interaction with, a remote bank server to enable at least one of online account management, bill payment, funds transfer, or checkbook transactions. Upon initial startup, the logic component 404 can request one or more credentials or responses to security questions by way of a rendered interface to authenticate a user and provide access to the bank server. After successful authentication, access can be provided, and a user can perform banking activities by way of the interface presented on the display of a select device.

The logic component 404 can also provide functionality for connecting with devices that include displays. For example, a device may need to be registered prior to usage. Registration may involve verifying the compatibility of a device with the payment card system. For instance, a device may need to be able to communicate with the card, provide access to a display, and permit interaction. Further, a check can be made to determine whether a device is on an allow list or deny list based on historical activities that may indicate whether or not a device is deemed safe or potentially compromised. Further yet, registration may be limited to particular devices by an enterprise based on an agreement between parties. Such devices could display a visual indicator that it is compatible with a payment card system. Registered device can be stored locally on the payment card, remotely on a server, or both. Registered devices may be able to automate connection in an expedited fashion over unregistered devices.

The application component 206 can also optionally include the suggestion component 406. The suggestion component 406 can identify potential helpful recommendations, reminders, or the like, which can be provided to the render component 400 for presentation in the user interface such as by way of a notification. The suggestion component 406 can employ any available data to determine suggestions. Statistical analysis or artificial intelligence techniques can be employed by the suggestion component 406 to determine suggestions for a user. Information regarding a user can be made available to the suggestion component 406 by a bank server with user permission. This data could be utilized to determine that a payment is due and generate a reminder of such payment. Additionally, data regarding device type and location can be employed. For example, if the device is a kiosk in a store, products of interest or current discounts or incentives can be suggested. More particularly, if the device is a treadmill in a gym, information can be provided regarding class availability, cancelations, closures, and gym promotions, among other things.

Returning to FIG. 2, the payment card system 100 also includes the security component 208. The security component 208 alone or in combination with the application component 206 can address security related concerns and implement preventive measures to mitigate security risks. In one instance, the security component 208 can store and access a unique token associated with the payment card system 100. The token can be provided as evidence of the identity of the card. Either or both of a communication provider and a server can request and receive the token, which can be compared with record of issued cards to verify that the card is valid and associated with a particular customer account. The security component 208 can also be employed to facilitate encrypted communication between the card and a device as well as the card and an enterprise server.

Further yet, the security component 208 can evaluate devices prior to registration and generate a security profile of the device. The security profile can then be utilized as a factor in determining whether or not the device should be registered. For example, the security profile can be compared to a threshold profile to make such a determination. Alternatively, the security profile can simply be communicated with a user so that the user understands and accepts the risks associated with a particular device. Still further yet, the security component 208 can monitor communications to detect potential security threats or fraud and at least flag interaction for subsequent analysis and remediation. For example, if a device is associated with one or more security threats or fraud the device can optionally be deactivated for use for example adding the device to a deny list that is checked prior to connection to the device.

The update component 210 is configured to check for updates or upgrades to firmware or software. If there is an available update or upgrade, the update component 210 can initiate installation of the update or upgrade. In at least this manner, the card can be current and have the most up-to-date features and security mechanisms. In one instance, detection of security threats compiled from multiple card security components can trigger an update to security mechanisms of the payment card system 100.

The payment card system 100 also includes the data store 212. The data store 212 can comprise a non-volatile storage mechanism. The data store 212 can store computer program code associated components of the payment card system 100 such as the communication component 200, application component 206, security component 208, and the update component 210. Further, the data store 212 can store data associated with such components. For example, the data store 212 can store a list of registered devices, a security token, and detected security threats. In some instances, the data store 212 can be referred to as memory since on a small scale there typically is not an accessible drive associated with the system. In this case, the memory is non-volatile so as not to lose data when not powered and in use.

With respect to power, the payment card system can draw power from a device to power operations. The power can be acquired through contact with a card reader. Alternatively, the power can be obtained without contact through electromagnetic energy similar to the manner in which passive radio frequency identification (RFID) acquires power. Additionally, or alternatively, the payment card system 100 can include and internal power source such as a battery. The internal power source can be a substitute for acquisition of power from a device or complementary wherein the internal power source is employed on an as needed basis based on the power required and the power available from the device. For example, the internal power source can be employed to update the payment card system 100 when not connected to a device. Further, the internal power source can be rechargeable and recharged by a device when connected. Alternate forms of recharging are also possible including kinetic motion such that it is possible to charge at least a portion of the internal power source be simply carrying the payment card system around on a daily basis.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. By way of example, and not limitation, the application component 206 and the security component 208 can employ such mechanisms to infer suggestions or recommendations as well as security or fraud threats.

In view of the example systems described above methods that may be implemented in accordance with the disclosed subject matter will be better appreciated with reference to flow chart diagrams of FIGS. 5-8. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
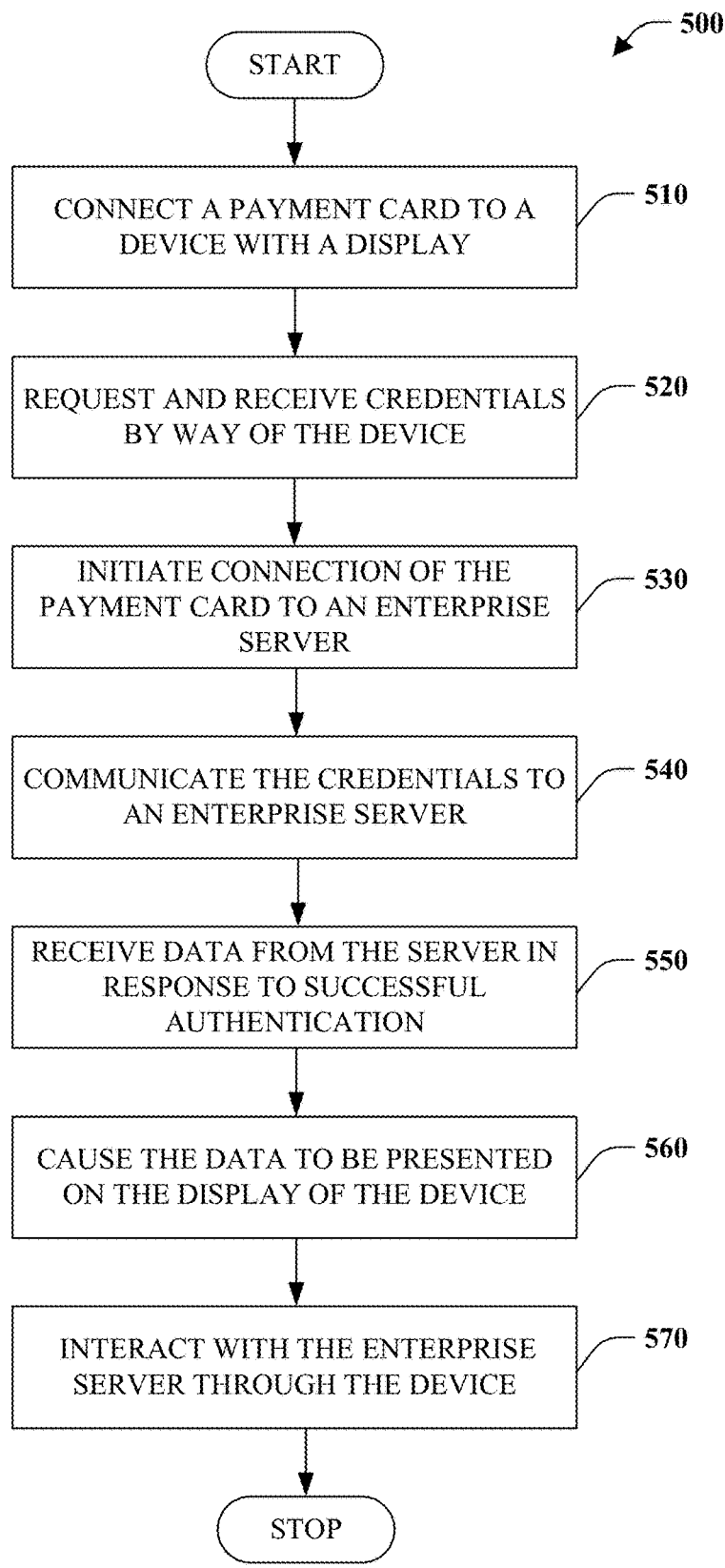
FIG. 5 is a flow chart diagram of a method of provisioning card enabled services.

FIG. 5 illustrates a method 500 of provisioning card enabled services. In accordance with one aspect, the method 500 can be executed by the payment card system 100 of FIGS. 1 and 2. More specifically, a processor embedded within the card can executed instructions stored on the card to implement the operations associated with method 500.

At reference numeral 510, a connection is established between a payment card and a device with a display. The connection can be either by way of contact or contactless. For instance, a card can be inserted into a slot provided by the device. Alternatively, the card can be connected wirelessly by radio frequency, for example by way of Bluetooth, or near field communication (NFC) protocol, among other protocols. The device can in one instance correspond to an internet of things (IoT) device such as a treadmill, car, kiosk, television, or refrigerator, among others. In other words, these devices are appliances designed for particular non-computing purposes. Of course, the devices can also correspond to general or specific purpose computing devices.

At numeral 520, credentials are requested and received by way of the connected device. An application on the payment card can be executed that generates a user interface that requests credentials or answers to security questions. The user interface can be conveyed to the device and presented on a display of the device. In response to receiving the request, the user can provide the credentials or answers to the security questions by interacting with the interface. In one instance, interaction can correspond to providing input through a touch screen display. Alternatively, input can be provided by other controls on the device such as buttons, knobs, dials, or sliders, among other things. In one embodiment, credentials can be provided automatically from the payment card. For example, prior input can be saved and retrieved, or a token can be acquired from the payment card.

At numeral 530, connection of the payment card to an enterprise server, such as a bank server is initiated. This action can involve connection to a service provider network. For instance, the service provider can be a cellular network. The payment card can employ at least an embedded antenna and a subscriber identification module (SIM) to initiate and establish a connection with the service provider. In accordance with one embodiment, connection is established with a channel dedicated for communication between cards and an enterprise server. In one instance, no other application can access or transmit data over this dedicated channel. Further, channel communications can be encrypted for additional security.

At numeral 540, acquired credentials or responses to security questions or the like can be communicated to an enterprise server by way of the service provider network. The enterprise server can receive the credentials and compare them to those recorded for the particular payment card and user. In a situation in which the enterprise service is associated with a financial institution, the credentials can compared to customer records to determine whether or not the accessing card and user match known customer account information. If there is a match, the card and user may be deemed authenticated or validated and allowed to proceed. By contrast, if there is a mismatch, the user may be considered unauthenticated or invalidated and blocked from further access. In some situations, the enterprise server may request further information to assist with authentication.

At 550, the payment card can receive data associated with the card or user from the server in response to successful authentication. For example, the data can be financial data associated with one or more accounts. The financial data can include such things as a current balance for each account and recent and post transactions associated with each account. In one instance, such data can be presented in a substantially raw form in a table or other structure such as a JavaScript Object Notation (JSON) or Extensible Markup Language (XML) file. Alternatively, the data can be returned with some form or indication as to how the data should be displayed such as in an Extensible Application Markup Language (XAML) format. As a result the server can either dictate form or cede the manner of presentation to an application on the payment card.

At numeral 560, the data received from the server can be caused to be presented on a display of the device. For instance, the data or a subset of the data can be utilized to populate at least a portion of a user interface. The user interface can then be generated and communicated to a connected device. The device can then cause the display to render the interface, for instance as an update to a previously displayed interface including the data.

At reference numeral 570, interactions can be performed with the enterprise server through a device and associated display. For example, the server can correspond to a bank server and the interface can be a bank service interface. A bank customer can utilize the bank service interface to perform banking activities such as account management, bill payment, and funds transfer. Moreover, the banking activities can be performed on substantially any machine with a display. Bank customers are not limited to performing banking activities on an automated teller machine or mobile phone application. Rather, they can simply empower a device such as a treadmill, television, refrigerator, or car to assist in performing a banking activity with a payment card.

Figure 6:
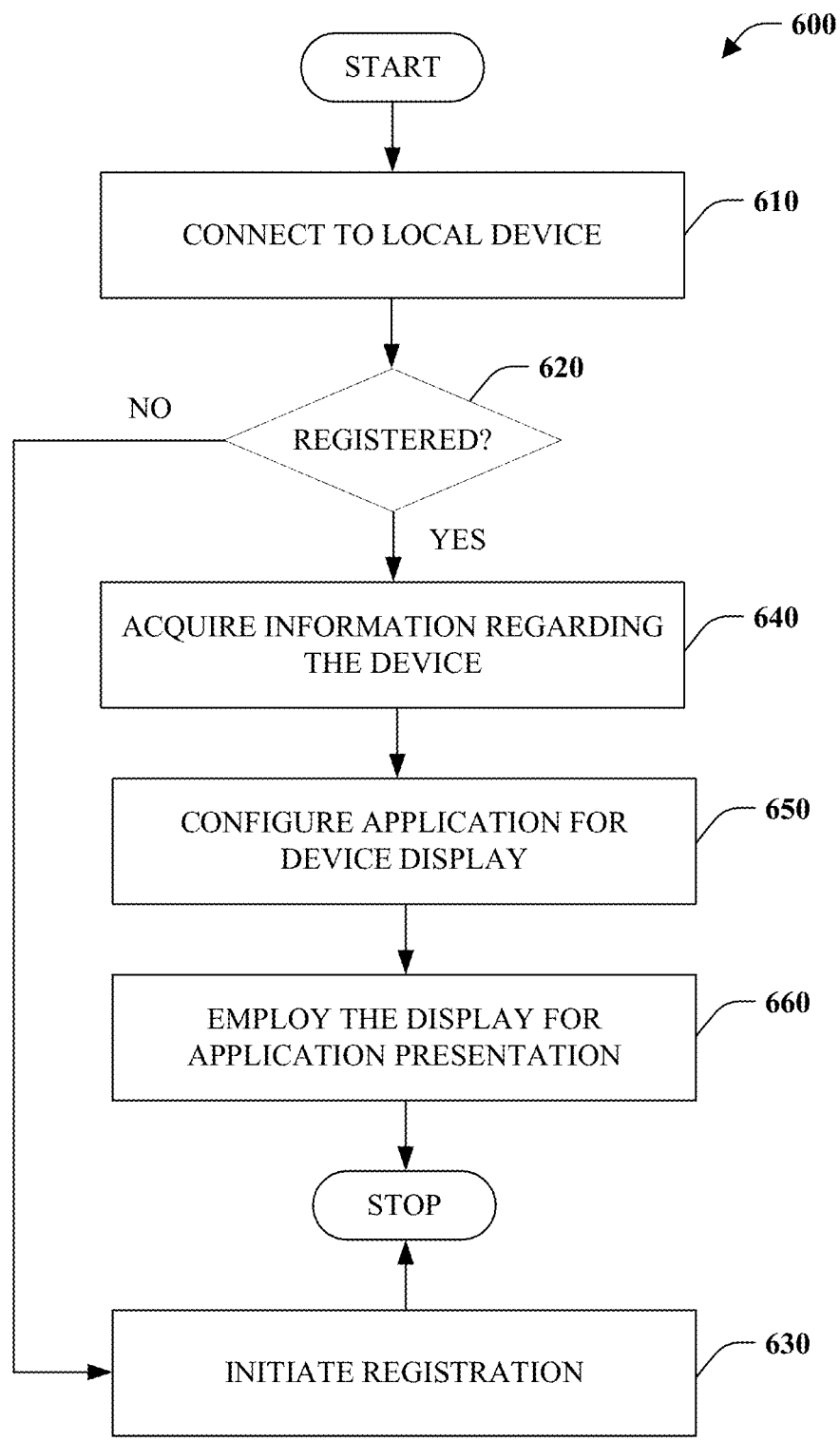
FIG. 6 is a flow chart diagram of a method of interacting with a device display.

FIG. 6 illustrates a flow chart diagram of a method 600 of interacting with a device including a display which can be utilized. The method 600 can be performed by the payment card system 100 and more particularly the communication component 200. A processor coupled with a memory can include instructions that when executed by the processor cause the processor to perform the operations set forth by method 600.

At reference numeral 610, a connection is made between a payment card and a local device. In other words, the payment card and the device are physically proximate or near. For example, the card can be inserted into a slot of a device and be physically connected to the device. Alternatively, the card can be connected wirelessly to a device within a predetermined distance that allows for such a connection. For example, Bluetooth or near field communication (NFC) can be employed to connect with the local device.

At 620, a determination is made as to whether or not the device is registered. A registered device is a device that is known and has likely been used in the past in conjunction with a payment card. Thus, a registered device is a device that will support interaction with the payment card as required. Optionally, a registered device may have passed a screening for security threats or possible fraud. If the device is not registered ("NO"), the method 600 proceeds to numeral 630 where a registration process is initiated. Alternatively, the method 600 can simply terminate. If the device is deemed registered at reference 620 ("YES"), the method 600 continues to numeral 640.

At numeral 640, information is acquired regarding the device. More specifically, information is obtained regarding a device display. For example, information can concern display size, resolution, brightness, and location, among other things. The information can be acquired in conjunction with registration and available for retrieval from a data store. Alternatively, device information can be looked up and acquired from an online data source. Further, the information can be requested and received from the device itself if capable.

At reference numeral 650, an application is configured for the device display. More specifically, the user interface or graphic elements are configured to be generated in a manner that supports use given particular information regarding the device display. For example, a bank service interface can be rendered differently on a small and low resolution display of a treadmill than it would be on a large and high resolution television or kiosk. Further yet other factors such as privacy concerns can also dictate at least the layout of graphical elements. For instance, access to an account number or balance may require an extra step to view when on a public device as opposed to on a private device.

At numeral 660, the display is employed to present the application. More particularly, a generated collection of graphical elements configured for a display as well as circumstances surrounding the display are communicated to a device and the associated display. The graphical elements are subsequently presented on the display. In accordance with one embodiment, the graphical elements can comprise a graphical user interface associated with a bank services application.

Figure 7:
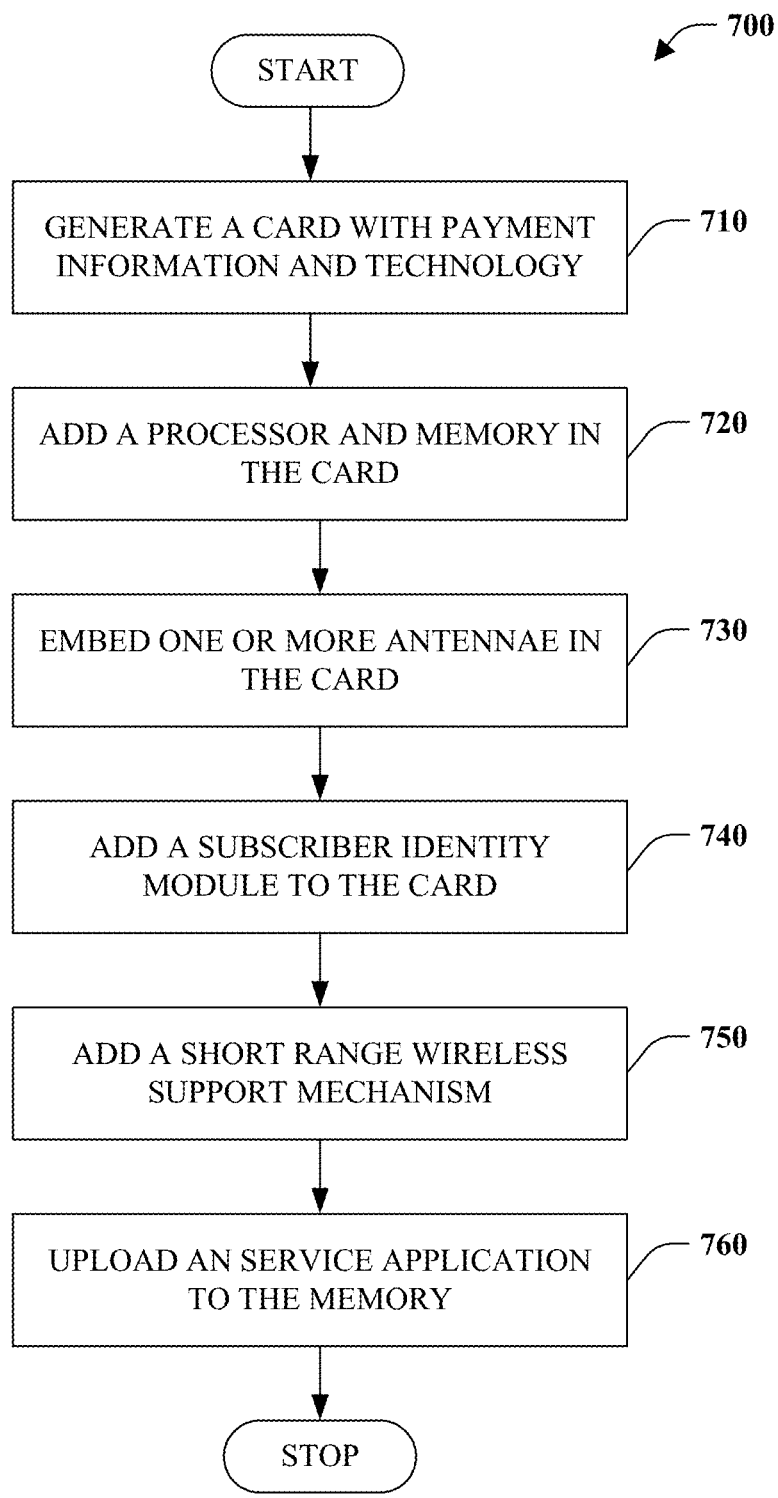
FIG. 7 is a flow chart diagram of a method of generating a payment card system.

FIG. 7 shows a flow chart diagram of a method 700 of generating a payment card system 100. The method 700 can be performed by a card manufacturer at the request of a financial institution such as a bank or credit card company.

At reference numeral 710, a card is generated with payment information and technology. The payment information can be account number, customer name, expiration date, verification code and other information regarding a bank and issuing financial institution. Additional technology can comprise a magnetic strip encoding the payment information, among other things.

At numeral 720, a processor and memory are added to the card. For example, the processor and memory can form part of a microchip that is affixed to the card. Here, the memory can serve as a non-volatile data store that saves data in the absence of power.

At numeral 730, one or more antennae are added to or embedded within the card. These antennae can be configured to receive and transmit data by way of radio waves or other frequency band. In this way, the antennae are supportive of communication.

At numeral 740, a subscriber identity module (SIM) can be added to the card. The SIM can be a physical card or and embedded SIM (eSIM). The SIM provides information to a cellular network carrier and enables communication by way of the cellular network. In one instance the SIM can dictate that a dedicated channel on the cellular network is to be used for communications to and from the card over the network.

At numeral 750, a short range wireless support mechanism can be added to the card. For example, support can be provided for near field communication (NFC), Bluetooth, or other communication protocol or mechanism. In this manner, the card can connect and communicate with a local device.

At reference numeral 760, a service application or the like is uploaded or saved to the card, for example in the memory. The service application is executable by the processor and configured to enable service interaction by way of a local device with a display or screen. The application can request and receive data from a remote bank server, generate a user interface that incorporates the data, transmit the user interface to the device wirelessly for presentation on the display of the device, and update the user interface in response to user input and interaction with the interface.

Optionally a power source such as a battery can be added to the card to facilitate operations especially when not connected to a device. For example, the battery may enable the card to be automatically updated or upgraded. Further, the battery can provide supplementary power when connected to and drawing power from a device directly through contact or electromagnetically. Further yet, a rechargeable battery can be utilized, which can draw power from a device to recharge the battery.

Figure 8:
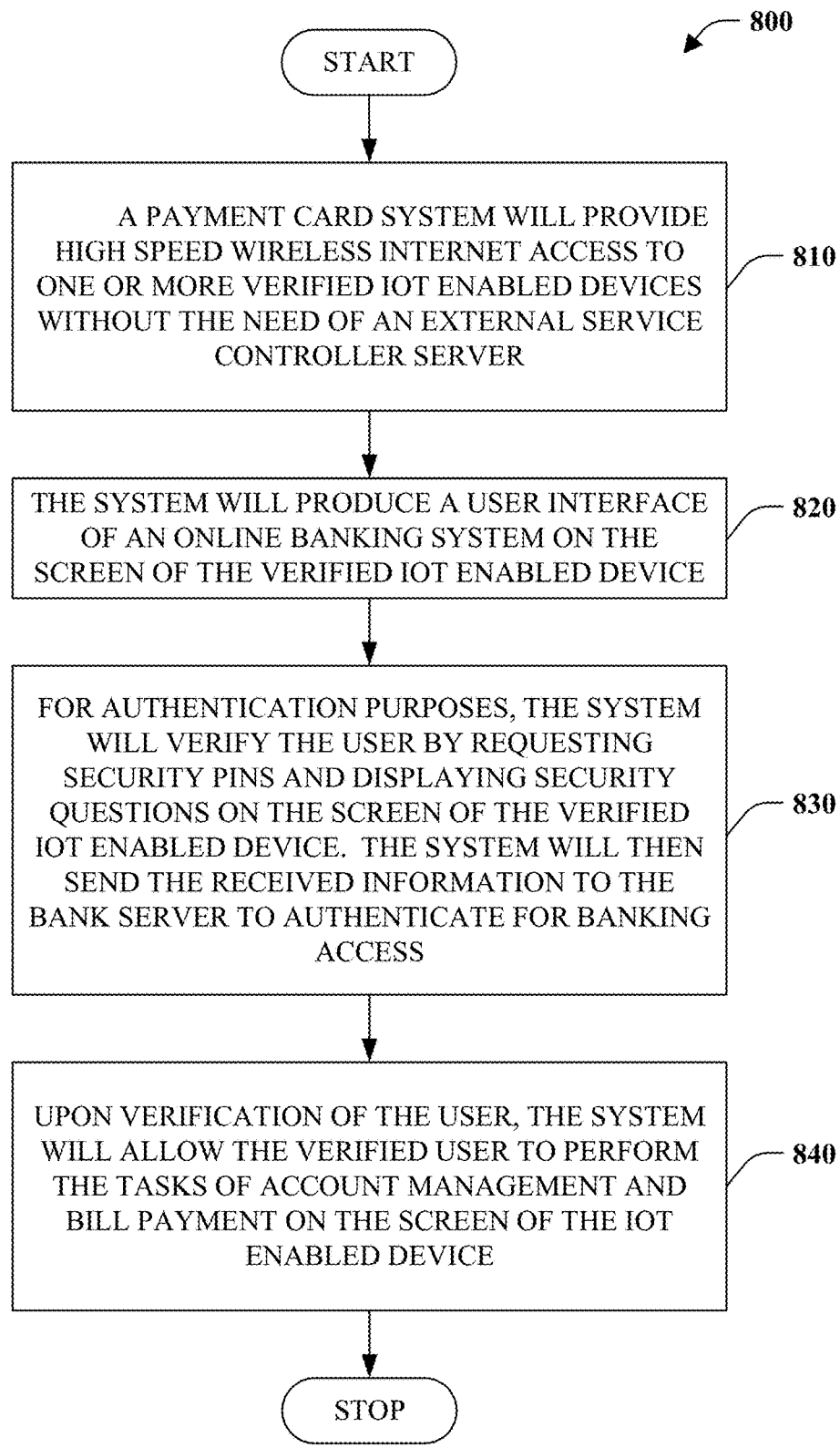
FIG. 8 is a flow chart diagram of a method accessing bank services with a payment card.

FIG. 8 depicts a method 800 of accessing banking services by way of the payment card system 100. At reference 810, the payment card system 100 will provide high speed wireless internet access to one or more verified internet of things (IoT) enabled devices. Further this access can be performed without the need for an external controller. For example the payment card system 100 can connect to such a device directly through contact or in a contact less manner utilizing Bluetooth or near field communication (NFC).

At reference numeral 820, the payment card system 100 will produce a user interface of an online banking system on the screen of the verified IoT enabled device. In one implementation, the payment card system 100 can generate the user interface and communicate the user interface to the device. Subsequently, the device can provide the interface to the screen or display of the device which will present the user interface.

At numeral 830, for authentication purposes, the payment card system 100 will verify the user be requesting security pins and displaying security questions on the screen of the device. Responses can then be sent to a bank server to authenticate for banking access. In one instance, the payment card system 100 can connect to a service provider network to communicate with the bank server. For example, the payment card system 100 can connect to a cellular network of a service provider. In one embodiment, a dedicated channel can be utilized for communications between the payment card system 100 and the bank server.

At numeral 840, upon verification of the user, the payment card system 100 will allow the verified user to perform tasks of account management and bill payment on the screen of the IoT enable device. More particularly, the payment card system can integrate data and functionality of the bank server into a generated interface. The generated interface can then be conveyed to the device and subsequently presented on the device screen. Furthermore, the interface can be interactive and changes can be provided to or made on the bank server to effect change.

Figure 9:
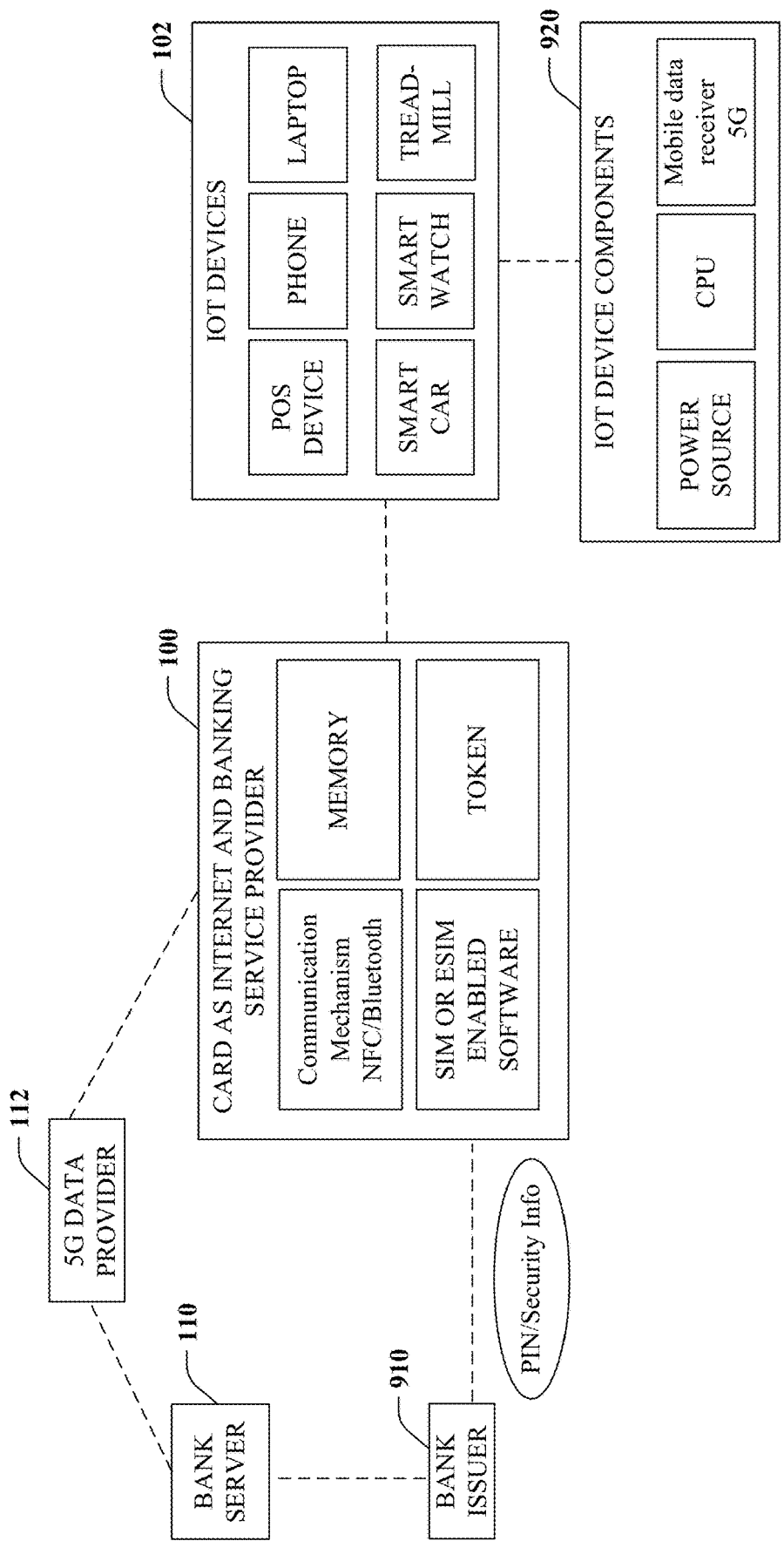
FIG. 9 is a block diagram of an example embodiment.

FIG. 9 illustrates an exemplary block diagram of an embodiment of aspects of the subject disclosure. As shown the payment card 100 can include a memory or like storage to save memories of its associated user and IoT enabled device. The payment card 100 can also have a token module and a SIM/E-SIM module. Additionally, in regard to communication, the payment card 100 can included an NFC/Bluetooth module. With these modules, the payment card 100 can connect to bank issuer 910 for payment processing and display banking services on the screen of a verified IoT device 102. In accordance with one embodiment, an IoT device can also connect to the bank issuer 910 for authentication purposes. Example IoT devices 102 include any smart device such as a point of sale (POS) device, phone, laptop, smart car, smart watch, treadmill or any other device with a screen that could potentially display a banking services platform. Within the IoT devices there is the power source, CPU, and the 5G data receiver, in which the purpose is to connect to the payment card and display the banking services that are authorized through the banking server 110. There may also be a data storage component that is used for user data, approval information and parameter configuration.

Aspects of the subject disclosure pertain to a technical problem associated with access to network-accessible services such as online banking services. The technical solution includes a physical card comprising mechanisms to communicate with a remote server and local device, and provide an interface for services to the local device for presentation on a display of the local device. In this manner, network-accessible services are available on substantially any device with a display that is able to communicate with the card. Additional technical aspects concern enabling secure access by employing a dedicated channel for communication between the card and the remote server, among other things.

For clarity and simplicity, the phrase "payment card" has been utilized throughout to denote the fact that the subject card can be a credit or debit card associated with a financial institution which can be dual purposed to facilitate access to online financial services. However, the card need not facilitate payment. For example, the card can be a special purpose card issued to enable access to online banking services. Furthermore, the card need not pertain to financial services at all. For example, the card can be an employee identification card that allows for access into buildings as well as access to a company server and associate services.

Throughout this disclosure discussion focused on identification and communication of a payment card with a device that includes a display. In this manner, the payment card can exploit the display and device for presentation and interaction. However, the subject disclosure is not limited in this way. In one instance, a projector can be added to the payment card. In this scenario, a device may not be needed as the card can project a user interface on a surface and receive input based on interaction with the user interface similar to how a smart board operates.

Aspects described herein disclose a communication mechanism can be embedded within a card to enable communication with a remote server over a dedicated channel, for example on a cellular data network. The dedicated channel enhances security but is not necessary. Further, the card may exploit external network access to complement embedded access or as a substitute for an embedded communication mechanism. Some devices, such as IoT devices, support and have access to a communication network. When a card interacts with such a device, network accessibility can be exploited in accordance with an alternate embodiment. In one instance, device network connectivity can be employed to authenticate a user with a remote server prior to establishing a connection by way of an embedded communication mechanism with a remote server. Alternatively, the device network connectivity can be utilized to support substantially all or a subset of communication with a remote server.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

To provide a context for the disclosed subject matter, FIG. 11 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computing devices. In a distributed computing environment, program modules may be located in one or both of local and remote memory devices.

Figure 10:
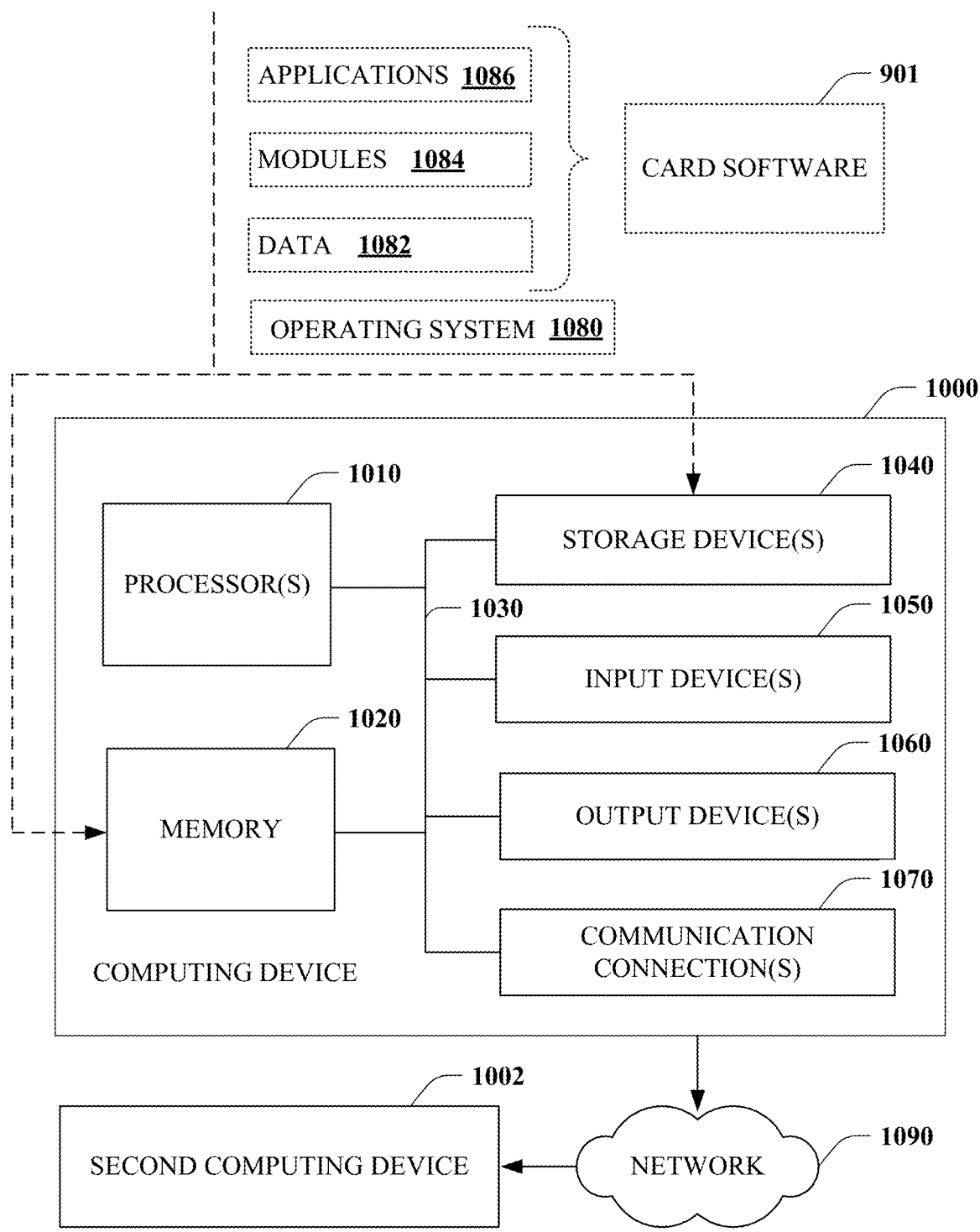
FIG. 10 is a schematic block diagram illustrating a suitable operating environment for aspects of the subject disclosure.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that is accessible to the computing device 1000 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the card software 901 (e.g., application, update, security, communication . . . ) can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system on a chip or like architecture can comprise a card such as the payment card system 100. Further, functionality associated with card software 901 can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system,, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. Further, in one particular instance the network 1090 can be a cellular data network. The second computing device 1002 can be another processor-based device with which the computing device 1000 can interact. In one instance, the computing device 1000 can correspond to a payment card system 100 and the second computing device 1002 can correspond to a remote server banking services. In another instance, the computing device 100 can again correspond to the payment card system 100, but the second computing device can correspond to a local machine comprising a display that can be utilized by computing device 100.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory on a payment card that includes instructions, that when executed by the processor, cause the processor to:
establish, via a communication component of the payment card, a first connection between the payment card and a device comprising a display screen, wherein the first connection comprises a limited distance radio frequency connection and the payment card is separate from the device;
determine, wirelessly via the limited distance radio frequency connection of the first connection, one or more of a size of the display screen of the device, a resolution of the display screen of the device, and a brightness of the display screen of the device;
establish, via a subscriber identity module (SIM) component of the payment card, a second connection between the payment card and a server by way of a dedicated communication channel, wherein the second connection comprises, at least in part, the limited distance radio frequency connection of the first connection;
cause transmission, via the second connection, of a request for information regarding one or more of a type of the device or a location of the device;
receive, via the second connection, a response to the request for information indicating one or more of the type of the device or the location of the device;
determine, based on the response to the request for information, one or more of the type of the device or the location of the device;
generate a suggestion based on one or more of the type of the device or the location of the device, wherein the suggestion comprises one or more of a product, a discount, or a promotion;
configure an interactive banking service interface for the display screen of the device based on the one or more of the size of the display screen of the device, the resolution of the display screen of the device, and the brightness of the display screen of the device, wherein configuring the interactive banking service interface comprises configuring the interactive banking service interface based on the information received in the response to the request for information regarding one or more of the type of the device or the location of the device, wherein configuring the interactive banking service interface comprises concealing, at least in part, sensitive information comprising one or more of an account number or a balance within the interactive banking service interface based on one or more of the type of the device or the location of the device;

communicate instructions, wirelessly via the limited distance radio frequency connection of the first connection, to render the interactive banking service interface on the display screen of the device based at least in part on the one or more of the size of the display screen of the device, the resolution of the display screen of the device, and the brightness of the display screen of the device, wherein the interactive banking service interface incorporates financial information associated with the payment card received from the server;

cause display of the suggestion at the display screen of the device; and cause display of the interactive banking service interface at the display screen of the device, wherein the interactive banking service interface is configured to allow a user to perform banking tasks associated with the payment card via user inputs to the interactive banking service interface at the display screen of the device.

2. The system of claim 1, wherein the banking tasks include at least one of account management, bill payment, electronic fund transfer, or checkbook transaction.

3. The system of claim 1, wherein the limited distance radio frequency connection is a wireless two-way connection.

4. The system of claim 1, wherein the dedicated communication channel is a dedicated communication channel of a cellular network.

5. The system of claim 1, wherein and the instructions further cause the processor to respond to a user input provided to the device via the display screen.

6. The system of claim 5, wherein the instructions further cause the processor to authenticate the user based on credentials provided as the user input.

7. The system of claim 1, wherein the device is one of an exercise machine or an automobile.

8. A method, comprising:
establishing, via a communication component of a payment card, a first connection between the payment card and a device comprising a display screen, wherein the first connection comprises a limited distance radio frequency connection and the payment card is separate from the device;

determining, wirelessly via the limited distance radio frequency connection of the first connection, one or more of a size of the display screen of the device, a resolution of the display screen of the device, and a brightness of the display screen of the device;

establishing, via a subscriber identity module (SIM) component of the payment card, a second connection between the payment card and a server by way of a dedicated communication channel, wherein the second connection comprises, at least in part, the limited distance radio frequency connection of the first connection;

causing transmission, via the second connection, of a request for information regarding one or more of a type of the device or a location of the device;

receiving, via the second connection, a response to the request for information indicating one or more of the type of the device or the location of the device;

determining based on the response to the request for information, one or more of the type of the device or the location of the device;

generating a suggestion based on one or more of the type of the device or the location of the device, wherein the suggestion comprises one or more of a product, a discount, or a promotion;

configuring an interactive banking service interface for the display screen of the device based on the one or more of the size of the display screen of the device, the resolution of the display screen of the device, and the brightness of the display screen of the device, wherein configuring the interactive banking service interface comprises configuring the interactive banking service interface based on the information received in the response to the request for information regarding one or more of the type of the device or the location of the device wherein configuring the interactive banking service interface comprises concealing, at least in part, sensitive information comprising one or more of an account number or a balance within the interactive banking service interface based on one or more of the type of the device or the location of the device;

communicating instructions, wirelessly via the limited distance radio frequency connection of the first connection, to render the interactive banking service interface on the display screen of the device based at least in part on the one or more of the size of the display screen of the device, the resolution of the display screen of the device, and the brightness of the display screen of the device, wherein the interactive banking service interface incorporates financial information associated with the payment card received from the server;

causing display of the suggestion at the display screen of the device; and causing display of the interactive banking service interface at the display screen of the device, wherein the interactive banking service interface is configured to allow a user to perform banking tasks associated with the payment card via user inputs to the interactive banking service interface at the display screen of the device.

9. The method of claim 8, wherein the banking tasks comprise at least one of bill payment, electronic fund transfer, or checkbook transaction.

10. The method of claim 8, further comprising processing a user input provided to the device via the display screen.

11. The method of claim 8, wherein the dedicated communication channel is a dedicated communication channel of a cellular network.

12. The method of claim 8, wherein the limited distance radio frequency connection is a wireless two-way connection.

13. A payment card system, comprising:
a processor coupled to a memory on a payment card that stores instructions that, when executed by the processor, cause the processor to:

determine one or more of a size of a display screen of a device, a resolution of the display screen of the device, and a brightness of the display screen of the device, wherein the payment card is separate from the device, cause transmission of a request for information regarding one or more of a type of the device or a location of the device, receive a response to the request for information indicating one or more of the type of the device or the location of the device, determine, based on the response to the request for information one or more of the type of the device or the location of the device, generate a suggestion based on one or more of the type of the device or the location of the device, wherein the suggestion comprises one or more of a product, a discount, or a promotion, configure an interactive banking service interface for the display screen of the device based on the one or more of the size of the display screen of the device, the resolution of the display screen of the device, and the brightness of the display screen of the device, wherein configuring the interactive banking service interface comprises configuring the interactive banking service interface based on the information received in the response to the request for information regarding one or more of the type of the device or the location of the device wherein configuring the interactive banking service interface comprises concealing, at least in part, sensitive information comprising one or more of an account number or a balance within the interactive banking service interface based on one or more of the type of the device or the location of the device, cause the suggestion to render on the display screen of the device, and cause the interactive banking service interface to render on the display screen of the device based at least in part on the one or more of the size of the display screen of the device, the resolution of the display screen of the device, and the brightness of the display screen of the device;

a subscriber identity module (SIM) that stores an international mobile subscriber identity (IMSI) number and key to establish communication with a server via a dedicated communication channel; and a communication component that enables wireless communication with the device comprising the display screen by way of a limited distance radio frequency connection, wherein the display screen of the device renders the interactive banking service interface based on data received from the server by way of the payment card, wherein the interactive banking service interface is configured to allow a user to perform banking tasks associated with the payment card via user inputs to the interactive banking service interface at the display screen of the device.

14. The payment card system of claim 13, further comprising a token to enable unique identification by the server.

15. The payment card system of claim 13, wherein the dedicated communication channel is a dedicated communication channel of a cellular network.

16. The payment card system of claim 15, wherein the dedicated communication channel is encrypted in response to successful authentication of the user.

17. The system of claim 1, wherein the instructions further cause the processor to provide the device with wireless internet access via the dedicated communication channel.

18. The payment card system of claim 13, wherein the banking tasks include at least one of account management, bill payment, electronic fund transfer, or checkbook transaction.

19. The payment card system of claim 13, wherein the limited distance radio frequency connection is a wireless two-way connection.

20. The payment card system of claim 13, wherein the device is one of an exercise machine or an automobile.

\* \* \* \* \*